INVENTOR.
ALVA W. WOODWARD

March 11, 1958     A. W. WOODWARD     2,826,234
METHOD OF FORMING RIM RIBS BY RELATIVE AXIAL
AND ROTATIVE MOVEMENT OF BENDING DIES
Filed Dec. 24, 1956     3 Sheets-Sheet 2

INVENTOR.
ALVA W. WOODWARD
BY
ATTORNEY

March 11, 1958   A. W. WOODWARD   2,826,234
METHOD OF FORMING RIM RIBS BY RELATIVE AXIAL
AND ROTATIVE MOVEMENT OF BENDING DIES
Filed Dec. 24, 1956   3 Sheets-Sheet 3

INVENTOR.
ALVA W. WOODWARD
BY
*R. L. Miller*
ATTORNEY

United States Patent Office 2,826,234
Patented Mar. 11, 1958

2,826,234

METHOD OF FORMING RIM RIBS BY RELATIVE AXIAL AND ROTATIVE MOVEMENT OF BENDING DIES

Alva W. Woodward, Kent, Ohio, assignor to The Goodyear Tire & Rubber Company, Akron, Ohio, a corporation of Ohio Application December 24, 1956, Serial No. 630,300

5 Claims. (Cl. 153—3)

This invention relates to a rim structure and more particularly to a method of forming a rim mounting structure that provides for changing the space between the wheels on which the rims are mounted.

There have been many varieties of rim mountings proposed which permit the position of the rim with respect to the wheel to be changed. In most instances, it is necessary to remove the rim to either change the position of the mounting lugs on the wheel or the rim on the lugs or both. In either case, the vehicle must be lifted or jacked up to get the wheels off the ground. A few structures have been proposed, which, basically provide mating helical surfaces on both the rim and wheels to permit the rim position to be changed by loosening the clamps and turning the wheel in a direction to cause the rim to "thread" in or out. The latter type of mounting eliminates many of the difficulties and objections common to the clamp type but does present manufacturing problems.

In each of "threading" types of rim mountings, there are a plurality, usually four or five, of similar mounting positions or stations spaced uniformly around the periphery of the rim. It is essential that each element of the mounting assembly, both on the wheel and rim, be precisely positioned so that the wheel and rim assemblies will mate and operate properly. The individual stations on the wheel or rim or both generally are individual elements, and, as a result, it is difficult to maintain the required accuracy on a mass production basis. It is therefore an object of this invention to provide a unique method of forming a rim mounting element of this type as a unit which may be accurately attached to the rim.

Another object of the invention is to provide a new and novel means of forming a rim mounting element.

A further object of the invention is to provide a new and novel method of forming a unitary circular multi-segment rim mounting element.

A still further object of the invention is to provide an inexpensive variable rim spacing mounting element.

Another object of the invention is to provide a rim mounting surface that does not require additional forming equipment other than that generally available.

Other objects and advantages of this invention will become apparent hereinafter as the description thereof proceeds, the novel features, arrangements and combinations being clearly pointed out in the specification as well as the claims thereunto appended.

Figure 1:
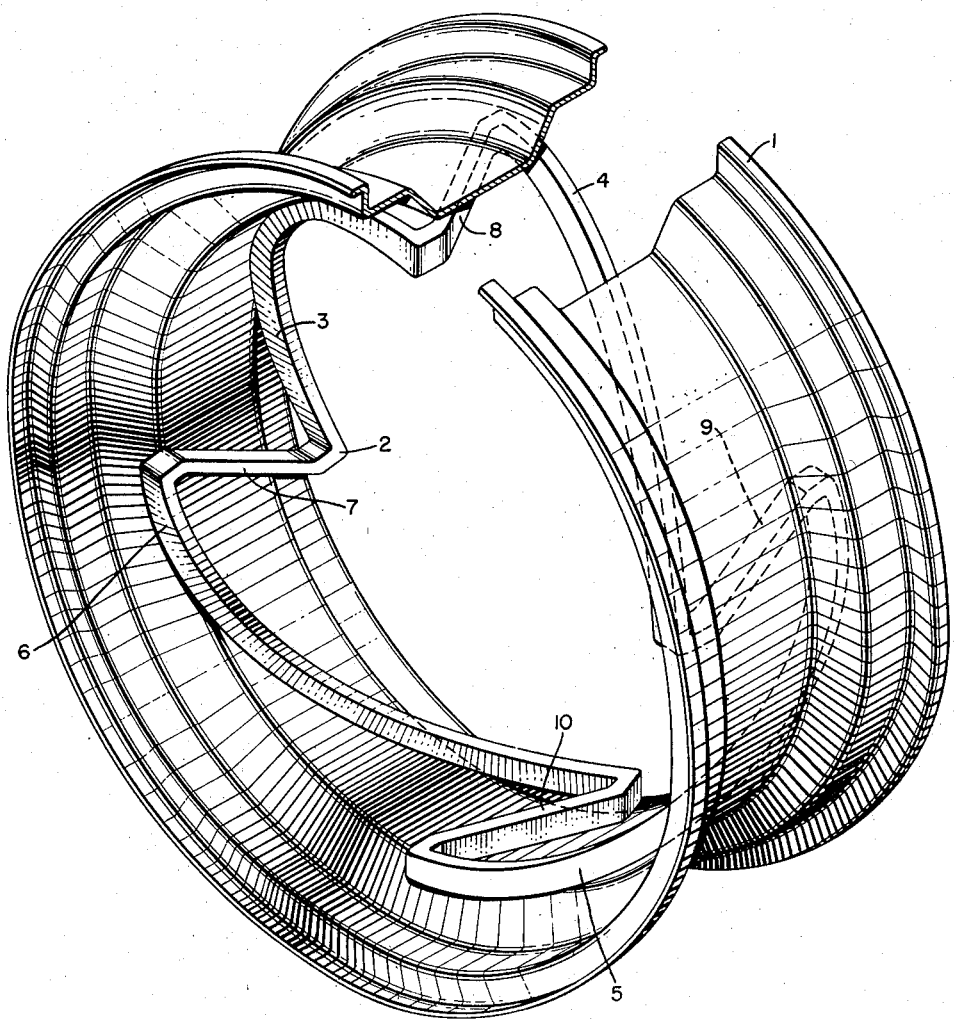
Fig. 1 is a perspective of a rim with the mounting ring attached thereto.

In the drawings, an agricultural rim 1 of the conventional drop center contour is shown for the purposes of illustration with the rim mounting element 2 attached to the inner periphery thereof. As shown, the mounting element 2 comprises a series of four similar segments 3, 4, 5 and 6 which extend across the inner periphery of the rim in the form of a helix at an angle with respect to the median plane of the rim. The segments are symmetrically positioned about the inner periphery of the rim and engage a groove on the outer periphery of the wheel (not shown). As is apparent, the segments 3, 4, 5 and 6 as they are mounted, are similar to a portion of quadruple thread that will cause the rim to move in or out with respect to the wheel as one is turned with respect to the other. The general arrangement and operation of these elements are well known in the art and no detailed explanation will be made herein.

The mounting segments 3, 4, 5 and 6 in the instant invention are formed as a unit and attached to the inner periphery of the rim by welding, riveting or any desired means. The substantially axially extending portions 7, 8, 9 and 10 connect the adjacent ends of mounting segments 3, 4, 5 and 6 but serve no function in the use of the mounting ring. The mounting element 2 is an endless ring formed of a series of helical mounting segments connected in tandem arrangement in the form of a ring having a diameter to fit the inner periphery of the rim. As shown, the segments 3, 4, 5 and 6 project slightly beyond each edge of the rim 1 in order that the required amount of lateral adjustment of each rim may be attained to provide for the maximum variance in crop spacing.

By forming the rim mounting segments as a unit, it is only necessary to position the ring with respect to the rim prior to attaching it. Unless the ring becomes distorted, each segment is accurately aligned with respect to the others so that the rim mounting segments will properly mate with the wheel. In forming the mounting ring, it is essential that metal remain uniform in section and not thin out or neck down at different positions around the periphery as would occur with the usual forming equipment and methods.

Figure 2:
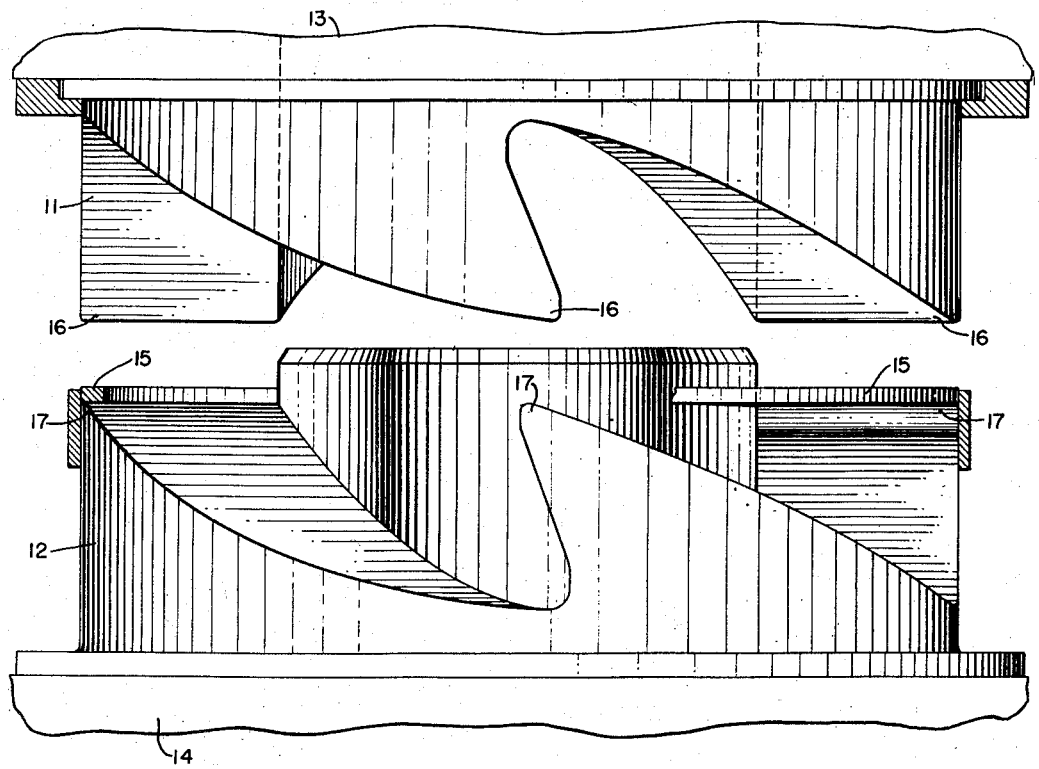
Fig. 2 is a front section of the forming die in the open position.
Figure 3:
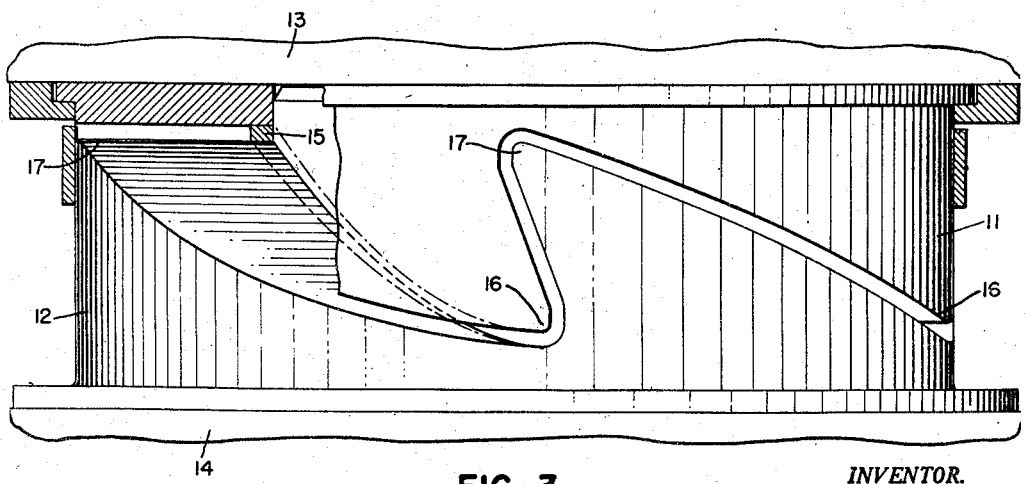
Fig. 3 is a front section of the forming die in the closed position.

Figs. 2 and 3 illustrate the forming die used in shaping the mounting ring 2. As shown, the upper and lower die sections 11 and 12 are mounted on the upper and lower platens 13 and 14 respectively of a platen press having sufficient travel to permit the die halves to be opened so that the mounting ring blank 15 may be placed in the lower die 12. In addition, one of the die sections 11 or 12 is mounted so as to rotate with respect to the other as the sections approach each other. Resultingly, the projection 16 moves from the position shown in Fig. 2 of the open die to that in Fig. 3 of the closed die. As seen in Fig. 2, the ring 15 from which the mounting ring 2 is formed lies around the outer periphery of the lower die 12. As the die closes, the ring 15 is formed between the die sections 11 and 12 and as the forming takes place the ring 15 moves radially inwardly between the die sections 11 and 12 so that when the die is closed, the ring 15 lies around the inner periphery of the lower die section 12 as seen in Fig. 3.

Each die section 11 and 12 includes a series of similar, uniformly, spaced saw-tooth projections 16 and 17 respectively. In the particular die illustrated, there are four projections 16 and 17, on the die sections 11 and 12 with the teeth of each section cooperating to form the mounting ring 2 from the ring blank 15. The die sections 11 and 12 each have the appearance of a dog clutch with a uniform space between them when in the closed position which corresponds to the desired contour of the finished mounting ring.

Figure 4:
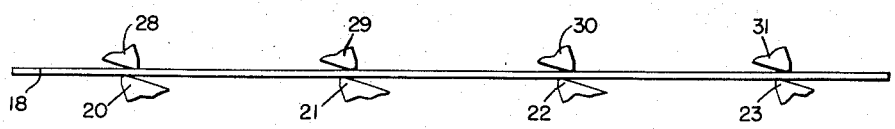
Figs. 4–9 are schematic views illustrating the method of forming the mounting ring shown in Fig. 1.
Figure 5:
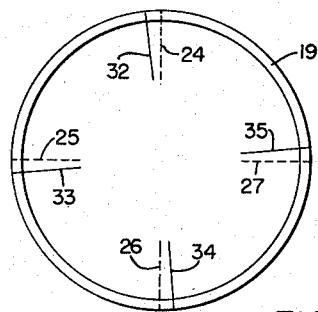
Figure 7:
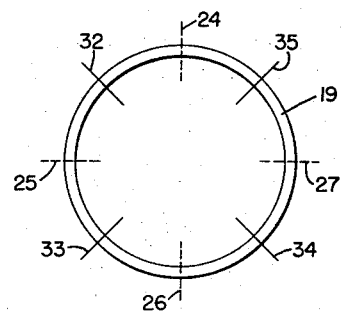
Figure 6:
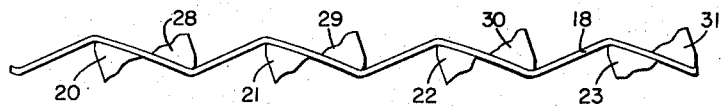
Figure 8:
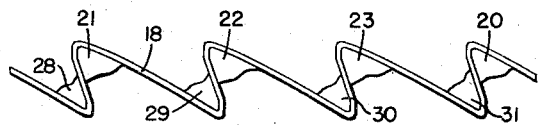
Figure 9:
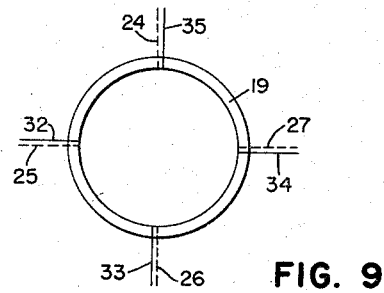

Figs. 4 to 9 inclusive schematically illustrate the method of forming the mounting ring 2 with Figs. 4, 6 and 8 being line representations of the strip and Figs. 5, 7 and 9 schematically illustrating the movement of the ring 15 with respect to the die sections as the strip is formed.

In order to form the mounting ring 2, a strip of suitable material such as steel is circled to form the ring 15. The strip has a cross-sectional width substantially equal to the required finished height of the mounting ring 2. The outer periphery of the ring 15 is substantially equal to the running periphery of the mounting ring 2 as measured along the outer edge of the formed ring. This length is represented by the line 18 in Figs. 4, 6 and 8 and, correspondingly, the outer periphery of the ring 19 of Figs. 5, 7 and 9. The symbols 20, 21, 22 and 23 in Figs. 4, 6 and 8 and lines 24, 25, 26 and 27 in Figs. 5, 7 and 9 represent the points of the projections 17 of the lower die section 12 as seen in Fig. 2. The symbols 28, 29, 30, and 31 in Figs. 4, 6 and 8 and lines 32, 33, 34, and 35 in Figs. 5, 7 and 9 respectively represent the points of the projections 16 of the die section 11.

As the ring 15 is placed on the die section 12 resting on the points 17 thereof, the points 16 are positioned circumferentially away from their mating point 17 of the lower die a sufficient distance circumferentially so that the points 16 and 17 of die sections 11 and 12 respectively engage the opposite sides of the strip 15 at points spaced apart a distance substantially equal to the difference between the planar distance between corresponding points of the finished ring 2 and the running length as measured between the same points along the shaped ring. This back spacing of one die section with respect to the other will eliminate any thinning out or neck down of the metal ring section as the ring 2 is formed, as a sufficient length of the ring is included between the points 16 and 17 to provide for the running length of the corresponding ring portion. The relative position of the points of the upper die and lower die at the initial stage of the die closing are represented in Fig. 4.

In Fig. 6 an intermediate position of the die sections 11 and 12 is represented in which the points 28, 29, 30 and 31 of the upper die section 11 have started to move toward the points 20, 21, 22 and 23 of the lower die section 12. This movement toward the lower die points is accomplished in the die by rotating the die sections 11 and 12 with respect to each other. As this rotation takes place, the portions of the ring 15 represented by line 18 and ring 19 in the diagrammatic figures are moved angularly out of the plane of the ring when the projections 16 move below the plane of the projections 17 as the die closes. This produces a long-pitch serrated shape to the ring as best seen in Fig. 6.

Fig. 8 represents the closed position of the die at the finish of the forming operation in which the ring 15 has assumed the shape of the mounting ring 2 (a series of sawteeth around a ring) with the total running periphery of the ring 2 equal to the circumference of the initial unshaped strip. In Fig. 8, the points 28, 29, 30 and 31 of the upper die section 11 have been rotated completely so as to mate with the corresponding 20, 21, 22 and 23 of the lower die section 12. This position corresponds to that of the die sections shown in Fig. 3 with the projections 16 and 17 only circumferentially spaced from each other the thickness of the metal ring 15. The ring 2 is then removed from the die and is ready for attachment to the rim as seen in Fig. 1.

In Figs. 5, 7 and 9 the rim and points of the die sections are illustrated to correspond with the positions shown in the linear illustrations of Figs. 4, 6 and 8 of the strip. The ring, as the die sections 11 and 12 close and simultaneously rotate, moves radially inwardly on the die to compensate for length of the ring taken by angular displacement thereof so that the diameter of the formed ring is less than that of the unformed ring 15.

In Figs. 4, 6 and 8 the horizontal length of line 18 progressively decreases in progressing through the figures but the running length remains constant. Correspondingly, in Figs. 5, 7 and 9, the diameter of ring 19 decreases in progressing through the figures due to the out of plane displacement in the forming operation.

While certain representative embodiments and details have been shown for the purpose of illustrating the invention, it will be apparent to those skilled in the art that various changes and modifications may be made therein without departing from the spirit or scope of the invention.

Having thus fully described my invention, what I claim and desire to secure by Letters Patent of the United States is:

1. Method of forming a one-piece rim mounting element for attachment to the inner periphery of the rim that provides for selective axial positioning of the rim on a vehicle wheel, said element including a group of similar angularly extending segments in tandem arrangement around the inner periphery of the rim joined by substantially axially extending portions, said method including the steps of providing an annular band of rigid formable material having a periphery substantially equal to that of the running length of said formed element, supporting said band on a first circular forming die section having a contour in elevation substantially that of the rim mounting element, providing a mating second die section above and spaced from said first die section, axially moving the die sections toward each other and simultaneously rotating them with respect to each other to shape the rim mounting element, the band moving uniformly radially inwardly between the die sections as they continue to move together to shape the mounting element without substantially reducing the thickness of the band at any section, the radial inward movement of the band as the die sections close reducing the diameter of the band to compensate for the length taken up by the axial extending portions in the formed element.

2. Method of forming a one-piece rim mounting element for attachment to the inner periphery of the rim that provides for selective axial positioning of the rim on a vehicle wheel, said element including a group of similar angularly extending segments in tandem arrangement around the inner periphery of the rim joined by substantially axially extending portions, said method including the steps of providing an annular band of rigid formable material having a periphery substantially equal to that of the running length of said formed element supporting said band on a first circular forming die section having a contour in elevation substantially that of the rim mounting element, said die section mounted on one platen of a platen press, providing a mating second die section above and spaced from said first die section on the other platen of the platen press, axially moving the die sections toward each other and simultaneously rotating them with respect to each other to shape the rim mounting element, the band moving uniformly radially inwardly between the die sections as they continue to move together to shape the mounting element without substantially reducing the thickness of the band at any section, the radial inward movement of the band as the die sections close reducing the diameter of the band to compensate for the length taken up by the axial extending portions in the formed element.

3. Method of forming a one-piece mounting ring for use in a wheel and rim combination wherein the axial position of the rim with respect to the wheel may be selectively controlled, said ring when in position including a group of similar segments extending angularly with respect to the plane of the wheel and in tandem arrangement around the ring, the segments being joined by substantially axially extending portions, said method including the steps of providing an annular band of rigid formable material having an initial periphery substantially equal to that of the running length of said formed ring, supporting said band on one section of a two-section annular forming die, each section having a contour substantially that of the formed rim mounting ring, said contour in elevation comprising a series of similar angular upwardly extending portions with substantially vertically extending portions joining the adjacent ends of the successive angular portions thus forming a series of similar saw-tooth projections on each die, axially moving the second die section toward said first die section to engage the points of the projections of said die sections on opposite sides of the band at circumferentially spaced points, the space being substantially equal to the difference in the horizontal length and running length between adjacent projections on the die sections, continuing the axial movement of said second section and simultaneously rotating said section to move the projections of the second section toward the projections of the first section to form the angular portions and vertical joining portions of the mounting ring with no substantial reduction in the thickness of the band, the band moving radially inwardly between the die sections as the forming progresses to compensate for the reduction in planar circumference of the band due to the shaping of the band.

4. Method of forming a one-piece rim mounting element for attachment to the inner periphery of the rim, to provide for selective axial positioning of the rim on a vehicle wheel, said element including a group of similar angularly extending segments in tandem arrangement around the inner periphery of the ring joined by substantially axially extending portions, said method including the steps of providing an annular band of rigid formable material having a periphery substantially equal to that of the running length of said formed element, supporting said band on one section of a two-section circular forming die, the second die section initially rotated out of alignment a distance sufficient to cause the points of the projections of the die sections to contact the band at a position so that the distance therebetween is substantially equal to difference in the horizontal length and running length between adjacent projections on the die sections, simultaneously closing and rotating to alignment said die sections with respect to each other to shape said band and reduce the diameter thereof, the band moving radially inwardly between the die sections as the closing and rotation progresses to accommodate the reduction in diameter due to the forming of the band without reduction in thickness.

5. The method of forming a two plane annular rim mounting element from an annular band with no substantial reduction in thickness comprising the steps of supporting an annular band of rigid formable material on a first section of a forming die, moving a second section of the forming die axially towards said first section to engage the annular band and form it thereby into the two plane contour, simultaneously rotating said die sections with respect to each other a distance substantially equal to the difference of the horizontal and running distances between corresponding points on the mounting element, and causing the annular ring to move radially inwardly between the die sections as they close and rotate to permit the diameter of the element to reduce during forming by an amount necessary to provide for the difference between the horizontal and running peripheries of the finished element without reducing the thickness of the band.

References Cited in the file of this patent

UNITED STATES PATENTS 891,642 Tietzmann _____ June 23, 1908

FOREIGN PATENTS 680,887 Germany _____ Sept. 9, 1939